No. 694,296. Patented Feb. 25, 1902.
L. E. MORGAL.
MILK AERATOR.
(Application filed Sept. 10, 1901.)
(No Model.) 2 Sheets—Sheet 1.

Witnesses
Geo. E. Buch.
M. A. Leonard.

Inventor
Lewis E. Morgal
By
Hensey & Gough
Attorneys

No. 694,296. Patented Feb. 25, 1902.
L. E. MORGAL.
MILK AERATOR.
(Application filed Sept. 10, 1901.)
(No Model.) 2 Sheets—Sheet 2.
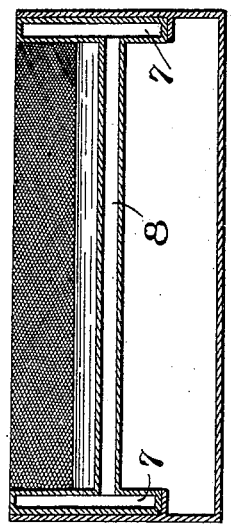
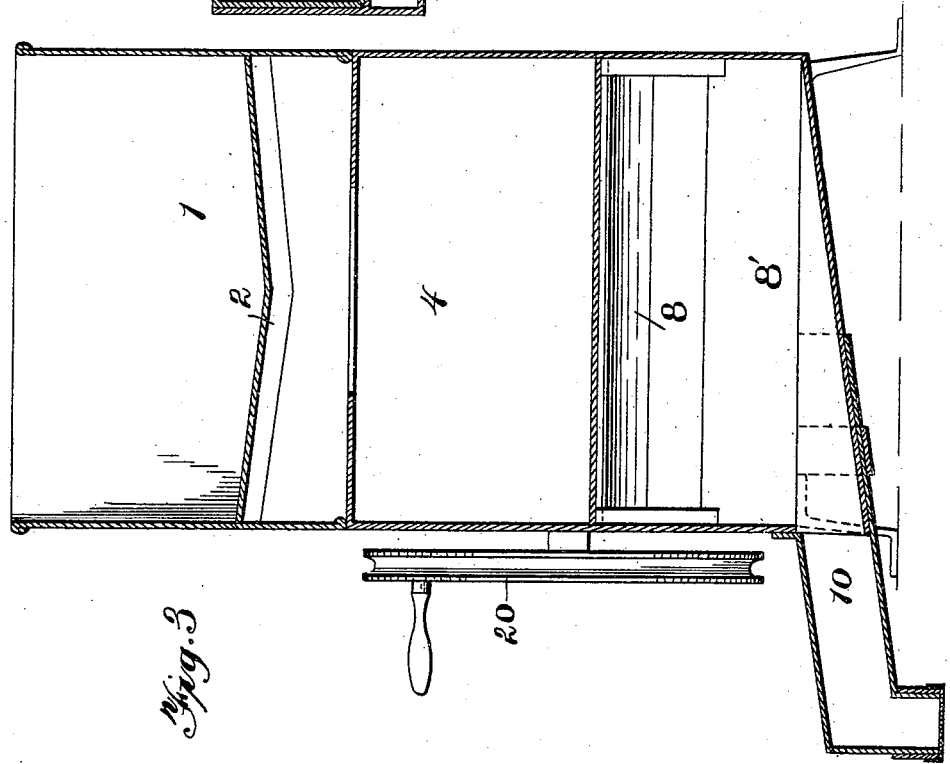
Witnesses
Geo. E. Frech.
M. A. Leonard.
Inventor
Lewis E. Morgal
By Heusen & Gough
Attorneys

UNITED STATES PATENT OFFICE.

LEWIS E. MORGAL, OF WASHINGTON, DISTRICT OF COLUMBIA, ASSIGNOR OF ONE-HALF TO CHARLES B. CROPLEY, OF WASHINGTON, DISTRICT OF COLUMBIA.

MILK-AERATOR.

SPECIFICATION forming part of Letters Patent No. 694,296, dated February 25, 1902.

Application filed September 10, 1901. Serial No. 74,879. (No model.)

*To all whom it may concern:*

Be it known that I, LEWIS E. MORGAL, a citizen of the United States, residing at Washington, District of Columbia, have invented certain new and useful Improvements in Milk Aerators, Purifiers, and Coolers; and I do declare the following to be a full, clear, and exact description of the invention, such as will enable others skilled in the art to which it appertains to make and use the same, reference being had to the accompanying drawings, which form a part of this specification.

This invention has relation to milk aerators, purifiers, and coolers; and it consists in the novel construction and arrangement of the parts, as hereinafter described.

The object of the invention is to provide an apparatus adapted to aerate, purify, and to cool milk and other liquids. This is done by means of forcing a blast of cold air through a falling stream of the liquid, which thoroughly aerates the latter, blowing all impurities therefrom and cools it.

Figure 1:
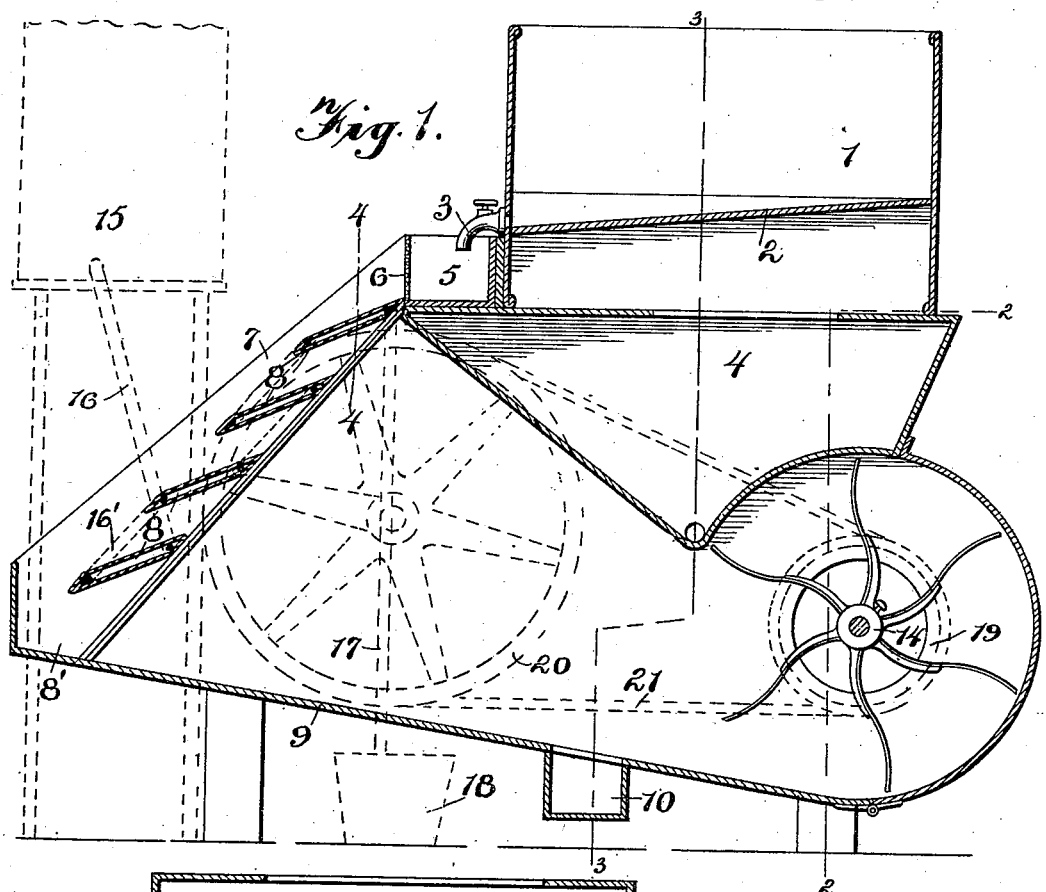
Figure 2:
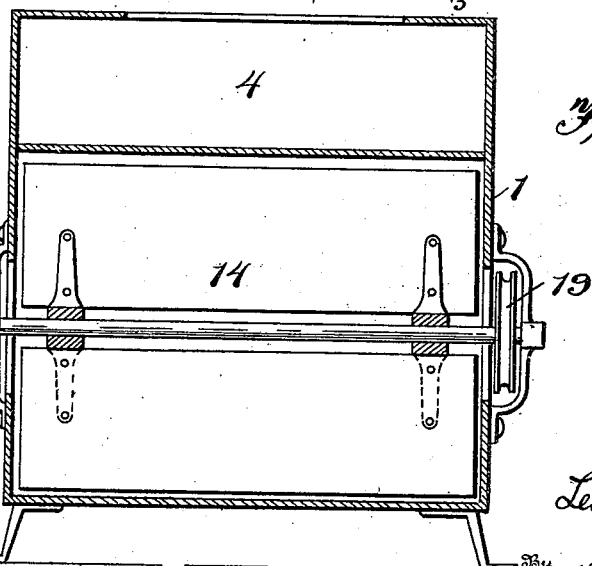

In the accompanying drawings, Figure 1 is a longitudinal sectional view of the device. Fig. 2 is a transverse sectional view cut on the line 2 2 of Fig. 1. Fig. 3 is a transverse sectional view cut on the line 3 3 of Fig. 1. Fig. 4 is a transverse sectional view of the device cut on the line 4 4 of Fig. 1.

The apparatus consists of a tank 1, which is adapted to hold the liquid to be treated. The said tank is provided with a slanting bottom 2, and at one side is provided with a cock 3, which enters the tank at the lowest point of the bottom. The tank 1 is removable and is normally placed over the chamber 4. Said chamber is adapted to hold ice or water. The top of the apparatus is provided with a trough 5, having in its outer side a screen 6. Said trough is adapted to receive the fluid from the cock 3. The inclined sides 7 are hollow in their interiors and extend down from the trough 5 and have supported between them the shelves 8. In the form of the invention shown the shelves 8 are hollow and connected at each end with the hollow interiors of the inclined side 7. The shelves 8 are arranged on an incline with relation to each other, each shelf slanting downward toward its outer edge. At the lower end of the side pieces 7 a trough 8' is arranged, said trough having an inclined bottom 9, which leads back to a receptacle 10, from which the liquid can be conducted to suitable vessels. The revolving fan 14 is suitably mounted on a shaft under the chamber 4.

In operation the device works as follows: The liquid is placed in the tank 1, the chamber 4 is filled with water and ice, and the fan 14 is started in motion. The liquid is permitted to run through the cock 3 into the trough 5. In passing through the screen 6 it is thoroughly screened and the solid particles of matter are removed from it. The liquid then falls down over the shelves 8 into the trough 8', and then runs along the inclined bottom 9 into the receptacle 10. At the same time a blast of cold air is forced by the fan 14 between the shelves 8 8. The blast passing through the flow of liquid falling from the outer edges of the shelves thoroughly aerates the liquid, removing all smell, and the chill from the water contained by the shelf and the side pieces cools the liquid. It will thus be seen that the liquid is thoroughly purified, aerated, and cooled.

I provide a tank 15, as shown in dotted lines in Fig. 1, which can receive cool water from a spring or any other source, and this water is conducted by means of the pipe 16 to the upper edge of the lower shelf 8, the water passing down the said shelf, then up through the pipe 16' to the next shelf, and so on through all of the upper shelves. It will thus be seen that as the milk is descending over the shelves the cool water is ascending through them, the advantage of which is that the lower shelves will at all times be the coldest. In the dotted lines shown in Fig. 1, 17 is the discharge-pipe, 18 is the receptacle for the discharged water, 19 is the belt-wheel of the fan, 20 is the wheel at which power is applied, and 21 the belt.

Having described my invention, what I claim as new, and desire to secure by Letters Patent, is—

1. An apparatus of the character described consisting of a series of hollow shelves over which a liquid is adapted to flow, hollow side pieces supporting said shelves and opening into the hollow interiors thereof, said hollow side pieces forming guides for the liquid, a means for supplying a cooling fluid attached to the apparatus and a means for forcing air through the liquid as it passes from shelf to shelf.

2. An apparatus of the character described, consisting of a series of hollow shelves over which a liquid is adapted to flow, hollow side pieces supporting said shelves and opening into hollow interiors thereof, said hollow side pieces forming guides for the liquid, a means for supplying a cooling fluid attached to the apparatus, a pipe connecting said cooling means with one of the hollow side pieces, a discharge-outlet attached to the opposite hollow side piece, and a means for forcing air through the liquid as it passes from shelf to shelf.

3. An apparatus of the character described, consisting of a series of shelves over which a liquid is adapted to flow, each shelf being downwardly inclined at its outer edge, each shelf being hollow in its interior and adapted to contain a cooling liquid, each shelf being of greater breadth than thickness, thereby affording an extensive surface coming in contact with the cooling medium, and the liquid to be treated, said shelves being arranged one above the other, the general line of the shelves being at an acute angle, a means for supplying a cooling fluid attached to the apparatus and a means for forcing air through the liquid as it passes from shelf to shelf.

4. An apparatus of the character described, consisting of a series of hollow shelves over which a liquid is adapted to flow, a means for supplying a cooling fluid consisting of an elevated tank, a pipe connecting said tank to the lowest shelf, a series of pipes connecting the shelves together, a discharge-outlet attached to the highest shelf, and a means for forcing air through the liquid as it passes from shelf to shelf.

5. An apparatus of the character described, consisting of a series of hollow shelves over which a liquid is adapted to flow, each shelf being downwardly inclined at its outer edge, each shelf being hollow in its interior and adapted to contain a cooling medium, each shelf being of greater breadth than depth, said shelves being arranged one above the other, the general line of the shelves being at an acute angle, a means for supplying a cooling fluid consisting of an elevated tank, a pipe connecting said tank with the lowest shelf, a series of pipes connecting the shelves together, a discharge-outlet attached to the highest shelf, and a means for forcing air through the liquid as it passes from shelf to shelf.

In testimony whereof I affix my signature in presence of two witnesses.

LEWIS E. MORGAL.

Witnesses:
  M. A. SCHEELE,
  LILLIE SCHEELE.